United States Patent [19]

Byrne et al.

[11] Patent Number: 4,940,592
[45] Date of Patent: Jul. 10, 1990

[54] PROCESS FOR MICROWAVE CHOCOLATE FLAVOR FORMATION IN AND/OR ON FOODSTUFFS AND PRODUCTS PRODUCED THEREBY

[75] Inventors: Brian Byrne, East Brunswick; Kevin P. Miller, Middletown; Chee-Teck Tan, Middletown; Lawrence L. Buckholz, Jr., Middletown; Marion A. Sudol, Boonton, all of N.J.

[73] Assignee: International Flavors & Fragrances Inc., New York, N.Y.

[21] Appl. No.: 371,635

[22] Filed: Jun. 26, 1989

[51] Int. Cl.$^5$ .......................... A23L 1/227; A21D 2/00
[52] U.S. Cl. ....................................... 426/94; 426/241; 426/243; 426/549; 426/533
[58] Field of Search .................. 426/94, 241, 243, 533, 426/549

[56] References Cited

U.S. PATENT DOCUMENTS

| | | | |
|---|---|---|---|
| 2,835,590 | 5/1958 | Rusoff | 426/533 |
| 2,835,592 | 5/1958 | Rusoff | 426/533 |
| 4,232,832 | 2/1981 | Moody | 426/241 |
| 4,396,635 | 8/1983 | Proudelbush et al. | 426/243 |
| 4,448,791 | 5/1984 | Fulde et al. | 426/94 |
| 4,518,618 | 5/1985 | Hsia et al. | 426/262 |
| 4,735,812 | 4/1988 | Bryson et al. | 426/262 |
| 4,740,376 | 4/1988 | Tang | 426/5 |
| 4,804,548 | 2/1989 | Shorma et al. | 426/96 |

FOREIGN PATENT DOCUMENTS 203725 12/1986 European Pat. Off. .

OTHER PUBLICATIONS

Copson et al., "Browning Methods in Microwave Cooking", Agricultural and Food Chemistry, vol. 3, No. 5, May 1955, pp. 424–427.

Primary Examiner—Donald E. Czaja
Assistant Examiner—Evan Federman
Attorney, Agent, or Firm—Arthur L. Liberman

[57] ABSTRACT

Described is a process for carrying out microwave production of baked goods having a chocolate flavoring thereon and/or therein and products produced thereby.

The process comprises the steps of:
(a) providing a composition of matter consisting essentially of precursors of a chocolate flavor (e.g., sugar, leucine and phenyl alanine) and a solvent capable of raising the dielectric constant of the surface and/or the internal matrix of a foodstuff to be cooked whereby the cooking time will be less than 120 seconds (such as propylene glycol or glycerin) and water;
(a') optionally, also providing a composition of matter consisting essentially of precursors of a Maillard reaction product flavor in admixture with the composition (a), supra, or separately with a solvent capable of raising the dielectric constant of the surface and/or internal matrix of the foodstuff to be cooked whereby the cooking time will be less than 120 seconds (such as propylene glycol or glycerine) and water;
(b) providing an uncooked baked goods foodstuff, e.g., dough;
(c) coating the composition of (a) and, optionally (a') onto the surface of the uncooked foodstuff and/or incorporating the composition of (a) and, optionally, (a') firstly into a controlled release system and then incorporating the controlled release system into the internal matrix of the foodstuff; and
(d) exposing the thus-treated uncooked foodstuff to microwave radiation for a period of under 120 seconds whereby the resulting product is caused to be edible as a cooked foodstuff having chocolate flavor nuances.

8 Claims, 6 Drawing Sheets

PROCESS FOR MICROWAVE CHOCOLATE FLAVOR FORMATION IN AND/OR ON FOODSTUFFS AND PRODUCTS PRODUCED THEREBY

BACKGROUND OF THE INVENTION

The increased use of microwaves for cooking has given rise to a large market in microwavable foods. While the advantage of microwave cooking over convection oven cooking is the time savings, the disadvantage heretofore has been that flavored baked goods do not develop the surface flavoring (in addition to browning or crust formation) or internal flavoring expected with convection oven cooking.

Our objective has been to create that internal and/or surface flavor retention and, optionally, browning which enhances the products' appearance, taste and mouth feel properties making it look as if it were cooked in a convection oven and making it taste as if it were cooked in a convection oven; particularly applied to chocolate flavored foodstuffs.

Heretofore, when using the microwave oven for cooking foodstuffs containing flavoring and browning formation additives, the food to be cooked taken in combination with additives therefor did not have the proper time-temperature-heat transfer variable (e.g., heat capacity, thermal conductivity, viscosity and density) combination for the (i) added materials useful for surface and/or internal flavoring to be effective or (ii) added chemicals responsible for browning and/or crust formation to react. Therefore, for a microwave (i) internal or surface flavoring system to work and (ii) browning and/or crust system to work, firstly, it must excellerate the rate of the browning reactions or locally increase the surface temperature and, secondly, the physical heat and mass transfer conditions must be such that the added flavor values; internal and/or surface must not be driven off or destroyed.

Ultimately, the reactions responsible for browning and/or flavor formation, particularly chocolate flavor formation have to be accomplished in the relatively short time frame dictated by the foods' preparation conditions. The times needed for preparing microwave foods vary depending upon the power output of the microwave unit and the mass of the food to be cooked. A typical 750 watt microwave will cook baked goods in 40 seconds to 4 minutes.

Several additional requirements for a successful microwave flavor retention system are as follows:
1. formation of a flavor (e.g., chocolate flavor) having authentic aroma and taste nuances;
2. retention of authentic flavor (e.g., chocolate) aroma and taste nuances.

Furthermore, when appropriate, several additional requirements for a successful microwave browning system are as follows:
1. in addition to the desired browning effect, it must generate either no aroma or one which is compatible with the target food (e.g., a chocolate flavored food such as a "brownie");
2. the browning reaction must not take place before cooking the food; and
3. after cooking, the browning must stop, and not cause the food to be darkened substantially so that it becomes aesthetically displeasing.

The reaction responsible for chocolate flavor formation during convection oven cooking is the reaction between sugar, leucine and phenyl alanine which results in the creation of various reaction products including aldol condensation products such as COCAL ® (a Registered Trademark of International Flavors & Fragrances Inc.) having the structure:

Furthermore, the reactions responsible for browning during convection oven cooking are the carmelization of sugars and the Maillard reaction between naturally occurring reducing sugars, amino acids, amines, peptides and proteins which results in the formation of colored melanoidins. Until recently (1984) there were numerous patent and literature references to such reactions for the production of flavors, where the generation of color was inconsequential or objectionable. In the past few years several patents have appeared wherein microwave browning created by Maillard reactions have been the topic.

Although the prior art does take advantage of the reaction between reducing sugars and amino acids, it has not made any correlation of reaction rates needed for browning reactions with reaction variables such as pH, solvent, amino acid reactivity or sugar reactivity.

Furthermore, although the prior art takes advantage of the reaction between amino acids and sugars to form flavors, e.g., chocolate flavors again it has not made any correlation of reaction rates needed for flavor retention with reaction variables such as pH, solvent, amino acid reactivity or sugar reactivity.

SUMMARY OF THE INVENTION

Our invention is directed to a process for providing a microwave-cooked baked goods foodstuff having flavor retention (preferably a chocolate flavored foodstuff) and, optionally, being given a natural "browning effect" and being given a natural "cresting" effect, comprising the steps of:

(a) providing a composition of matter consisting essentially of precursors of a reaction flavor (preferably a chocolate reaction flavor; e.g., a sugar, leucine and phenyl alanine) and a solvent capable of raising the dielectric constant of the surface and/or the internal matrix of an uncooked foodstuff to be cooked whereby the cooking time will be less than 120 seconds (such as propylene glycol or glycerine or a mixture of glycerine and propylene glycol; or a mixture of glycerine and ethanol; or a mixture of propylene glycol and ethanol) and water;

(a') optionally, also providing a Maillard reaction product flavor in admixture with composition (a), supra, or separately with a solvent capable of raising the dielectric constant of the surface and/or internal matrix of the foodstuff to be cooked whereby the cooking time will be less than 120 seconds (such as propylene glycol or glycerine) and water;

(b) providing an uncooked baked goods foodstuff, e.g., dough;

(c) coating the composition of (a) and, optionally, (a') onto the surface of the uncooked foodstuff and/or incorporating the composition of (a) and optionally, (a') first into a controlled release system (such as a drum chilled or spray chilled product) and then incorporating the controlled release system into the internal matrix of the foodstuff; and

(d) exposing the thus-treated uncooked foodstuff to microwave radiation for a period of under 120 seconds whereby the resulting product is caused to be edible as a cooked foodstuff having, flavored nuances, preferably chocolate flavor nuances and optionally having a naturally "browned" and/or "crusty" surface.

Our invention is also directed to the products produced according to such process.

In carrying out a preferred aspect of our invention, a chocolate flavor would be produced either (a) in the coating of the foodstuff during the microwave cooking and/or (b) in the internal matrix of the foodstuff being cooked via the microwave cooking. Such chocolate flavor necessarily contains the compound "CO-CAL" ® a Registered Trademark of International Flavors & Fragrances Inc. having the structure:

The precursors for producing such a chocolate flavor are phenyl alanine having the structure:

leucine having the structure:

and a sugar shown by the letter:

S

The reaction for forming the chocolate flavor either in the surface coating or in the internal matrix of the foodstuff being subjected to microwave cooking is as follows:

wherein the symbol:

R is indicative of other reaction products being formed in the formation of the chocolate flavor. In causing the process of our invention to be operable, the proper solvent-reactant makeup must be employed. Necessarily, the reaction solvent (when carrying out that aspect of the process of our invention employing coating of the flavor precursor composition onto uncooked foodstuff) physical properties are interrelated.

Thus, a mathematical model found to be useful in relating each of the variables involved in the development of our invention is set forth thusly:

$$\frac{dQ}{d\theta} = \left\{ \frac{R}{K} + \frac{\mu}{\lambda_1 C_p \rho^2 R^2 (T_2 - T_1)} + \frac{1}{h_A} + \lambda_2 \left[ \frac{T_2 - T_1}{T_2^4 - T_1^4} \right] \right\} E^2 \nu \epsilon'.$$

In an approximate version an equation for calculating the time of heating as a function of viscosity of the coating (prior to cooking) and further, as a function of the temperature differential between the center of the food article to be cooked and the outer surface of the coating during the microwave browning operation is set forth thusly:

$$\Delta\theta(\text{TIME}) = \frac{\text{TOTAL MICROWAVE ENERGY INPUT, } \Delta Q}{\left\{ \frac{R}{K} + \frac{\mu}{\lambda_1 C_p \rho^2 R^2 (T_2 - T_1)} + \frac{1}{h_A} + \lambda_2 \left[ \frac{T_2 - T_1}{T_2^4 - T_1^4} \right] \right\} E^2 \nu \epsilon'}$$

wherein the terms $\Delta Q$ is the total microwave energy input during the process of our invention;

$\frac{dQ}{d\theta}$ is the rate of heat input equivalent to the rate of energy use by the microwave oven;

R is the effective radius of the food article being cooked;

K is the heat transfer coefficient of the food article being cooked (the solid material);

$\mu$ is the viscosity of the coating immediately prior to cooking;

$\lambda_1$ is a proportionality constant which is a function of the coating thickness immediately prior to cooking and the geometry of the article being cooked as well as the geometry of the microwave oven;

$C_p$ is the heat capacity of the coating immediately prior to cooking;

$\rho$ is the density of the liquid coating immediately prior to cooking;

T1 the temperature at the center of the food article being cooked;

T2 is the temperature at the outer surface of the food article being cooked;

$h_a$ is the convection heat transfer coefficient for the air layer surrounding the food article being cooked;

$\lambda_2$ proportionality constant for radiation term for concentric spheres (the coating surrounding the uncooked food);

$\epsilon$ electric field strength;

$\nu$ frequency;

$\epsilon'$ relative dielectric constant of coating material;

$\Delta\theta$ time of microwave cooking.

The foregoing equations were derived from equations set forth in:
  "Heat Transfer And Food Products", Hallstrom, et al, Elsevier Applied Science Publishing Company, 1988;
  "Principals of Chemical Engineering", Walker, et al, Third Edition, McGraw Hill Book Company, 1937; and
  "Chemical Engineer's Handbook", Fifth Edition, Perry and Chilton, McGraw Hill Book Company, pages 10-10, 10-11 and 10-12.

In another aspect of our invention, the flavor precursors (and, optionally, the browning precursors compatible therewith) are first incorporated into a controlled release system prior to incorporation into the matrix of the foodstuff to be cooked via microwave cooking. Thus, for example, the amino acid precursors (leucine and phenyl alanine) taken together with a sugar are admixed with a fat in a weight ratio of from about 1 part precursor composition to 2 parts fat composition down to 1 fat composition to 2 parts precursor composition. The resulting mixture is drum chilled as more specifically set forth in the examples, infra. The drum chilled product is then incorporated into an uncooked foodstuff, for example, uncooked cookie dough. The resulting product is then placed in a microwave oven yielding a chocolate flavored cake product having substantially entire flavor retention.

Rather than using actual fat, or spray chilled or drum chilled product, the flavor precursor mixture together with solvent (e.g., ethanol and glycerine) can be intimately admixed with melted bakers chocolate. The resulting mixture is then further admixed with cooking ingredients such as corn oil, vegetable shortening, egg, water, salt, baking soda and flour. The resulting product is cooked in a microwave oven yielding a product having a superior taste and room aroma as further exemplified, infra.

DETAILED DESCRIPTION OF THE INVENTION

In copending application for U.S. Pat. Ser. No. 356,503 filed on May 25, 1989 (IFF-4815J) which is a continuation-in-part of application for U.S. Pat. Ser. No. 295,450 filed on Jan. 10, 1989 and in application for U.S. Pat. Ser. No. 295,450 filed on Jan. 10, 1989, it was shown that the order of sugar reactivities observed for the typical thermally induced Amadori and Maillard reactions holds true in microwave cooking. It was further shown that pentoses were more reactive than hexoses and 6-deoxyhexoses were more reactive than hexoses.

Our invention herein has shown that there is a strong relationship between the sugar reactivity and the particular amino acid utilized for production of chocolate flavor whether in a coating formulation during the microwave cooking or whether it is introduced into the matrix of foodstuff to be cooked by means of incorporation of the flavor precursors in a controlled release system as by spray chilling, drum chilling or merely by incorporation into cocoa butter.

We have also found that chocolate flavor precursors, that is, phenyl alanine, leucine and a sugar such as ribose, rhamnose or cerelose may be used in conjunction with a compatible browning reaction system.

In application for U.S. Pat. Ser. No. 295,450 filed on Jan. 10, 1989, incorporated herein by reference it was shown that there is a strong relationship between pH and reactivity. At pH's in the range of 9-13, a browning reaction was accelerated at acid pH's. Such a rate enhancement was attributed to the removal of a proton from the amino acid leaving the amino acid group unprotonated and therefore, more nucleophilic. It was indicated therein that the consequence of the latter is to accelerate the nucleophilic substitution of the amino group on the carbonyl of the reducing sugar. Since this reaction is the first step in the formation of color, it was concluded that this is the rate determining step to melanoidins.

The instant invention, also carried out at pH's in the range of 9-13 involves amino acid degradation followed by aldol condensation, interalia. Thus, phenyl alanine and leucine are reacted in the presence of a sugar such as ribose, rhamnose and cerelose at a pH in the range of 9-13. The reaction for the purposes of carrying out same in a coating on an uncooked foodstuff during microwave cooking is carried out using a specific solvent. An unexpected finding in the instant invention is that the solvent in which the flavor is formed dramatically affects the rate of reaction. Aprotic solvents, such as triacetin and vegetable oil, are useless in such a reaction system since the reactants are not soluble in the solvent. Polar protic solvents are amongst the solvents in which the reactants are soluble; however, not all members of this solvent class are useful for carrying out the reaction, to wit:

wherein the symbol:

S represents a sugar and the symbol:

R represents other reaction products necessary to create a chocolate flavor.

Both water and ethanol are unacceptable, per se as solvents since the rate of the reaction:

in these solvents is on the order of hours.

In propylene glycol and glycerine the rate of the reaction:

+ R is rapid, achieving the desired chocolate flavor formation in 40 seconds to 2 minutes (120 seconds).

In application for U.S. Pat. Ser. No. 295,450 filed on Jan. 10, 1989 it was shown that the solvent in which the Maillard browning is run dramatically affects the rate of browning. It was also shown there that aprotic solvents, such as triacetin and vegetable oil, were useless in the browning reaction systems since the reactants in the Maillard reaction were not soluble in the solvent. Polar protic solvents were set forth to be amongst the solvents in which the Maillard reactants are soluble; and it was further indicated that not all members of this solvent class are useful for microwave browning. It was further indicated that both water and ethanol, per se, are unacceptable as solvents since the rate of the browning reaction in these solvents is on the order of hours. It was further indicated that in propylene glycol and glycerine the rate of browning is rapid, achieving the desired coloration in 40 seconds to 2 minutes (120 seconds).

The mechanism of solvent action is believed to be twofold. First, the ability of the solvent to solubilize the reactants is essential; however, that in itself is insufficient to qualify a solvent without the second property. The successful solvent has the ability to absorb microwave radiation (2450 MHz) and retain this absorbed energy as heat. Solvents with high heat capacities, high viscosities and low thermal conductivities are desirable (that is high Prandtl numbers), to wit:

$$\frac{C_p \mu}{K}$$

as they facilitate heat retention. With the above properties, the solvent effectively focuses part of the microwave radiation on the food's surface, locally raising the temperature and accelerating the reaction:

and, optionally, the browning reaction (if desired). Propylene glycol and glycerine are two materials which meet the necessary requirements as solvents for the reaction:

and, optionally, as solvents for the microwave browning reaction.

When desired to carry out a browning reaction simultaneously with the carrying out of the reaction:

examples of Maillard reaction products useful in the practice of our invention are as follows:

(a) reaction products of amino acids and sugars as described in U.S. Pat. No. 4,735,812 issued on Apr. 5, 1988, the specification of which is incorporated herein by reference;

(b) reaction product of a monosaccharide and/or a disaccharide and an amino acid as described in U.S. Pat. No. 4,547,377 issued on Oct. 15, 1985, the specification of which is incorporated by reference herein;

(c) Amadori products as described in Chem. Abstracts, Volume 109:169074 g as set forth below:
109:169074 g Studies of the Maillard reaction. Part 15. Derivatographic studies of the systems D-glucose/glycine, alanine, phenylalanine and the corresponding Amadori products. Westphal, G.; Oersi, F.; Kroh, L. (Sekt. Nahrungsguterwirtsch. Lebensmitteltechnol., Humboldt-Univ., Berlin, Ger. Dem. Rep.). Nahrung 1988, 32(2), 109–16 (Ger). From results of investigations of the D-glucose/DL-phenylalanine (1:1) model it was possible to classify under the chosen conditions the reaction into an earlier phase with a temp. of 130°, a developed phase at 130°–150° and the beginning of the final phase of the Maillard reaction at >150° whereby insol. polymers were formed. The loss of carbohydrates and amino acids caused by thermal changes can be detd. by HPLC. A comparative study of the derivatograms of the 3 model systems (D-glucose with glycine, DL-alanine, and DL-phenylalanine) with their corresponding Amadori products shows the thermal instability of the Amadori compds. depended on the aglycon. The extremely small endothermal enthalpy values (DTA curves) of the reaction products supports this assumption.

and (d) flavor compounds which are Amadori rearrangement compounds of 6-deoxy-aldohexoses such as rhamnose and alpha amino acids such as proline as described in detail in U.S. Pat. No. 4,022,920 issued on May 10, 1977, the specification of which is incorporated herein by reference.

Figure 1:
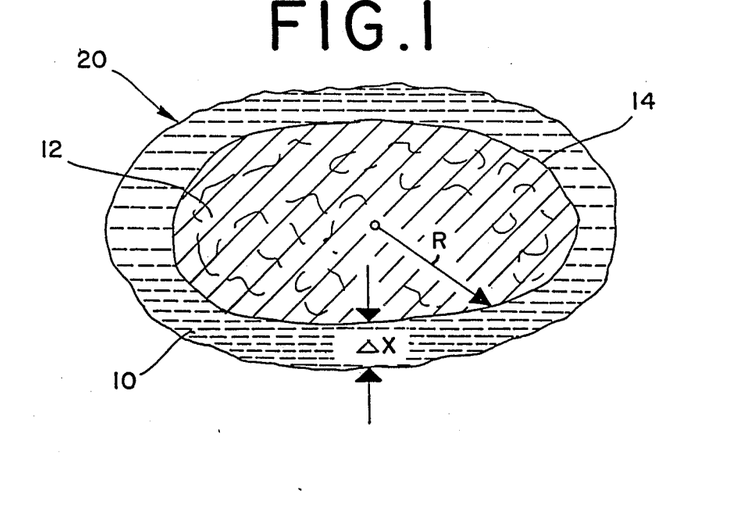
FIG. 1 is a cut-away side elevation view of a coated food article prior to carrying out the microwave flavor formation (and, optionally, browning) step of the process of our invention.

With respect to the sugar components of the reactants in the coating, whereby the reaction:

is carried out indicated by reference numeral 10 in FIG. 1, the preferred sugars are:
(i) ribose;
(ii) rhamnose; and
(iii) cerelose.

With respect to the sugar components of the reactants in the coating when desired to also carry out a browning reaction, with the coating being indicated by reference numeral 10 in FIG. 1, the preferred order of use is as follows (in descending order):
(i) ribose; and
(ii) rhamnose.

In the browning reaction when it is desired to be carried out simultaneously with the reaction:

with respect to the amino acid component of the reaction material, lysine and proline are prefered; but glycine and alanine are not recommended. Dimethylanthranilate having the structure:

and secondary amino acids and diamino acids in general are preferred. Thus, lysine having the structure:

is a preferred structure and proline having the structure:

is a preferred material. Also useful are dipeptides.

Referring now to the drawings, FIG. 1 is a cut-away side elevation view of the coated food article prior to cooking. The overall article is indicated by reference numeral 20. The uncooked baked goods material is indicated by reference numeral 12 having an effective radius "R". The coating containing the mixture of precursors, the phenyl alanine having the structure:

the leucine having the structure:

and the sugar, that is, ribose, rhamnose or cerelose, for example, for the reaction:

in a solvent which is capable of raising the dielectric constant of the surface of the foodstuff 12 to be cooked whereby the foodstuff to be cooked is completely cooked in a period of time under 120 seconds is indicated by reference numeral 10. The coating is located on the surface of the food article 12 and reference numeral 14 indicates the surface of the uncooked baked goods composition. The term "ΔX" is the thickness of the coating prior to microwave cooking.

Figure 2:
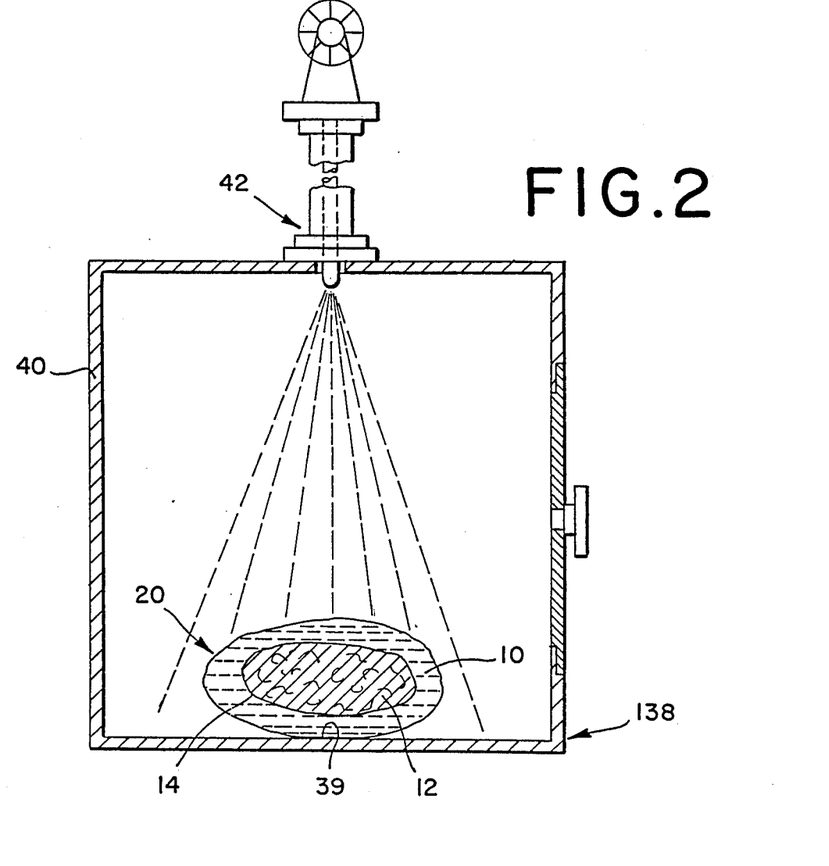
FIG. 2 is a cut-away side elevation view (in schematic form) of a microwave oven containing a coated food article prior to and during the carrying out of the process of our invention.

FIG. 2 is a schematic diagram of the coated food article in a microwave oven during the carrying out of the process of our invention. The food article 20 having the coating 10 on the uncooked baked goods (solid) 12 is contained in microwave oven 138, more specifically in box 40 wherein microwave source 42 emits energy substantially perpendicular to the upper surface of the food article 20. The microwave energy passes through the coating surface and causes the reaction in coating 10 to take place, to wit:

whereby a chocolate flavor is produced which includes the compound having the structure:

In addition a reaction may also take place whereby Maillard or Amadori reaction products are produced.

The syrup 10 heats up and activates the molecules of the reactants. Simultaneously, the solid material 12 (the uncooked baked goods) is heated and the coating 10 is adsorbed through the surface 14 into the outer interstices of the baked goods article 12. Prior to 120 seconds the entire baked goods article 12 is cooked and the surface coating now containing the chocolate flavor and, optionally, the Amadori or Maillard reaction product is substantially adsorbed into the outer interstices of the baked goods article.

The food article 20 rests at point 39 in box 40.

Figure 3:
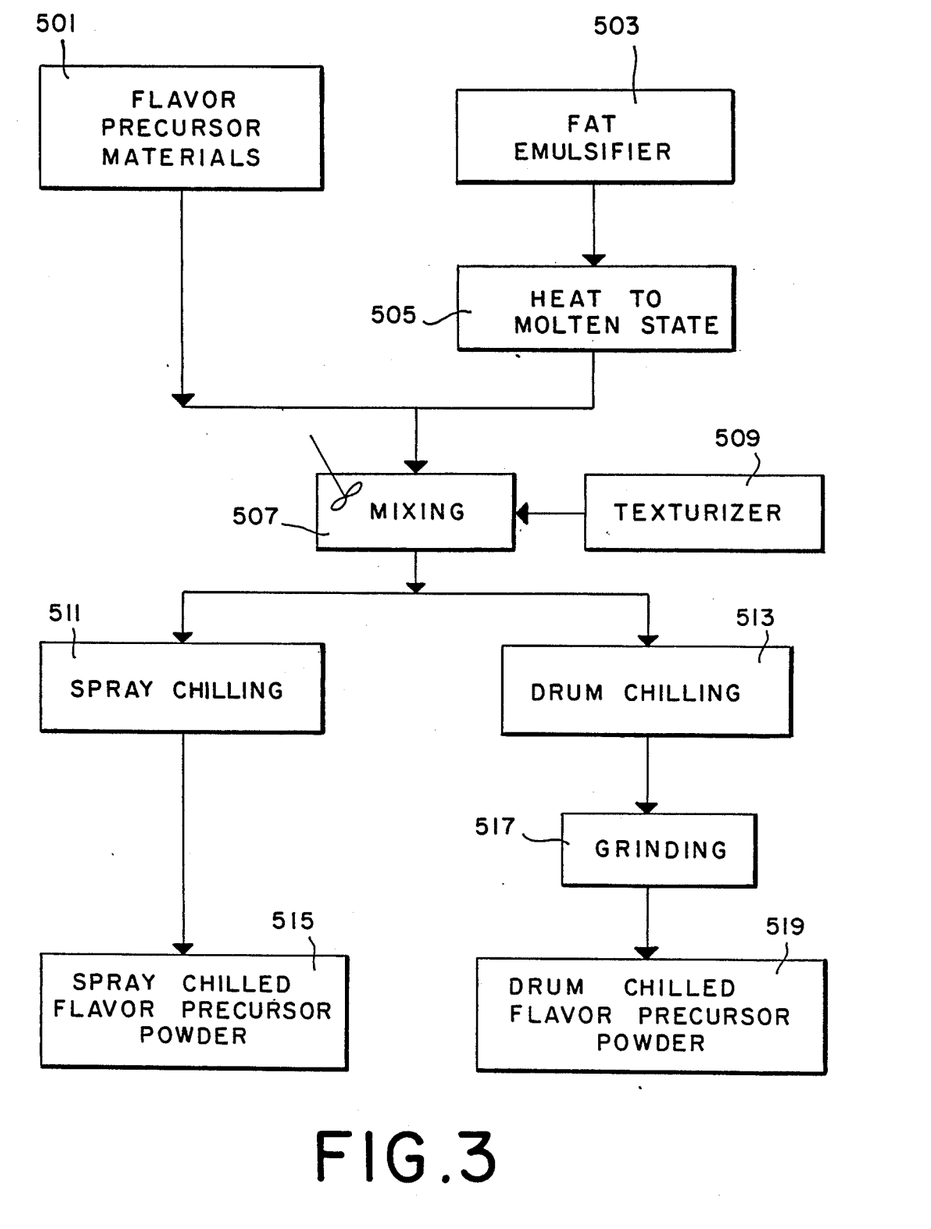
FIG. 3 is a block flow diagram showing the steps, in schematic form, for carrying out the process for forming drum chilled flavor precursor powder and spray chilled flavor precursor powder useful in the practice of the process of our invention.

FIG. 3 sets forth a schematic block flow diagram of the process for producing spray chilled flavor precursor powder or drum chilled flavor precusor powder useful in forming material for incorporation into the interstices of the uncooked baked goods product prior to microwave cooking (rather than as a "coating").

The flavor precursor materials which would include the leucine, phenyl alanine and sugar at 501 are admixed with molten fat and emulsifier from source 503 which is heated to its molten state at 505 and mixed with the flavor precursor materials at 507. Into the mixing operation is also placed texturizer from source 509. Drum chilling at 513 results in a product which is ground at 517 and sent to location 519 for further use. Spray chilling at location 511 of the resulting mixed texturized product causes the spray chilled flavor precursor product to be available for the microwave cooking step at location 515.

Examples of fatty materials useful in this process are set forth, supra and their respective melting points are as follows:

TABLE I

| Fatty Material | Melting Point Range |
|---|---|
| Partially hydrogenated cotton seed oil | 141–147° F. |
| Partially hydrogenated soybean oil | 152–158° F. |
| Partially hydrogenated palm oil | 136–144° F. |
| Mono and diglycerides | 136–156° F. |
| Glycerol monstearate | 158° F. |
| Glycerol monopalmitate | 132° F. |
| Propylene glycol monostearate | 136° F. |
| Polyglycerol stearate | 127–135° F. |
| Polyoxyethylene sorbitol beeswax derivatives | 145–154° F. |
| Polyoxyethylene sorbitan esters of fatty acids | 140–144° F. |
| Sorbitan monostearate | 121–127° F. |
| Polyglycerol esters of fatty acids | 135–138° F. |
| Beeswax | 143–150° F. |
| Carnauba wax | 180–186° F. |

Texturizers include precipitated silicon dioxide, for example, SIPERNAT ®50S (bulked density 6.2pounds per cubic foot; particle size 8 microns; surface area 450 square meters per gram manufactured by the Degussa Corporation of Teterboro, New Jersey. Other silicon dioxide texturizers are as follows:

SIPERNAT ®22S manufactured by Degussa Corparation;

ZEOTHIX ®265 manufactured by J. M. Huber Corporation of Havre de Grace, Maryland;

CAB-SIL ® EH-5 manufactured by the Cabot Corporation, of Tuscola, Illinois.

Figure 4:
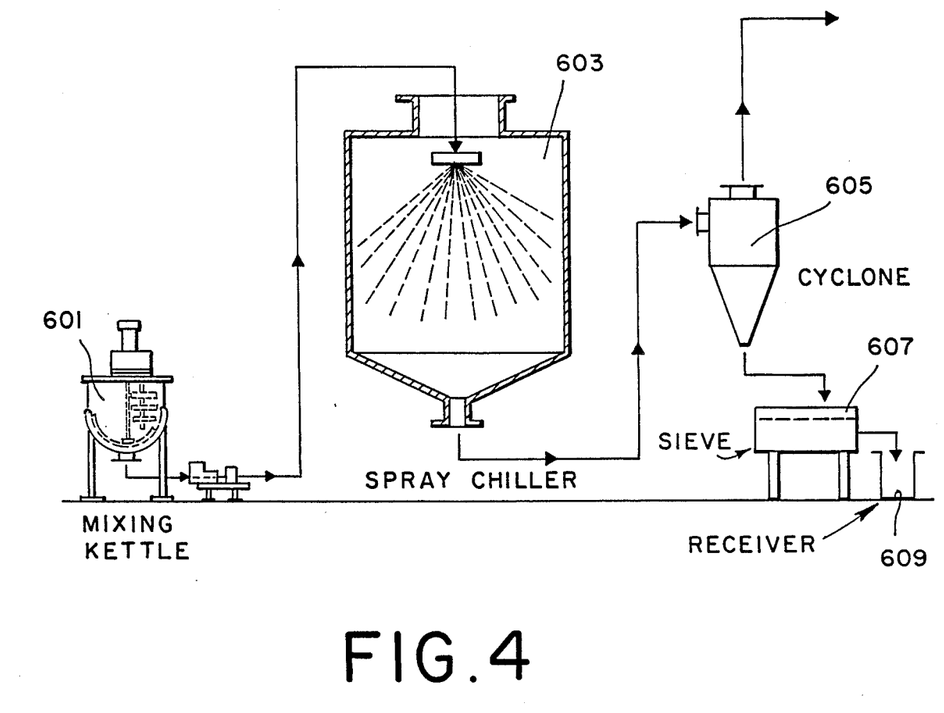
FIG. 4 is a schematic diagram setting forth apparatus and process steps useful in forming spray chilled flavor precursor powder useful in the practice of the process of our invention.

FIG 4. is a diagram of the process and apparatus (in schematic form) for producing spray chilled flavor precursor powder useful in the process of our invention. Flavor precursor materials, fat emulsifier in molten state and texturizer are admixed in mixing kettle 601. The resulting mixture is sprayed chilled in spray chiller 603 and the resulting spray chilled articles containing flavor precursor are classified. The classification is carried out in cyclone separator 605 with the larger size particles which are useful in the practice of our invention going through sieve 607 into receiver 609.

More specifically, the molten mixture maintained in the fluid state is pumped to the "spray chiller" which is actually a spray-drier and atomized into fine droplets using an atomizer. A nozzle may be specifically engineered to exclude chilled air or chilled air may be utilized to solidify the resulting fat particles. Atmospheric unheated air may be used to blow through the spray-drier. The final product collected is in fine powder form with particles about 50–120 microns in size.

Figure 5:
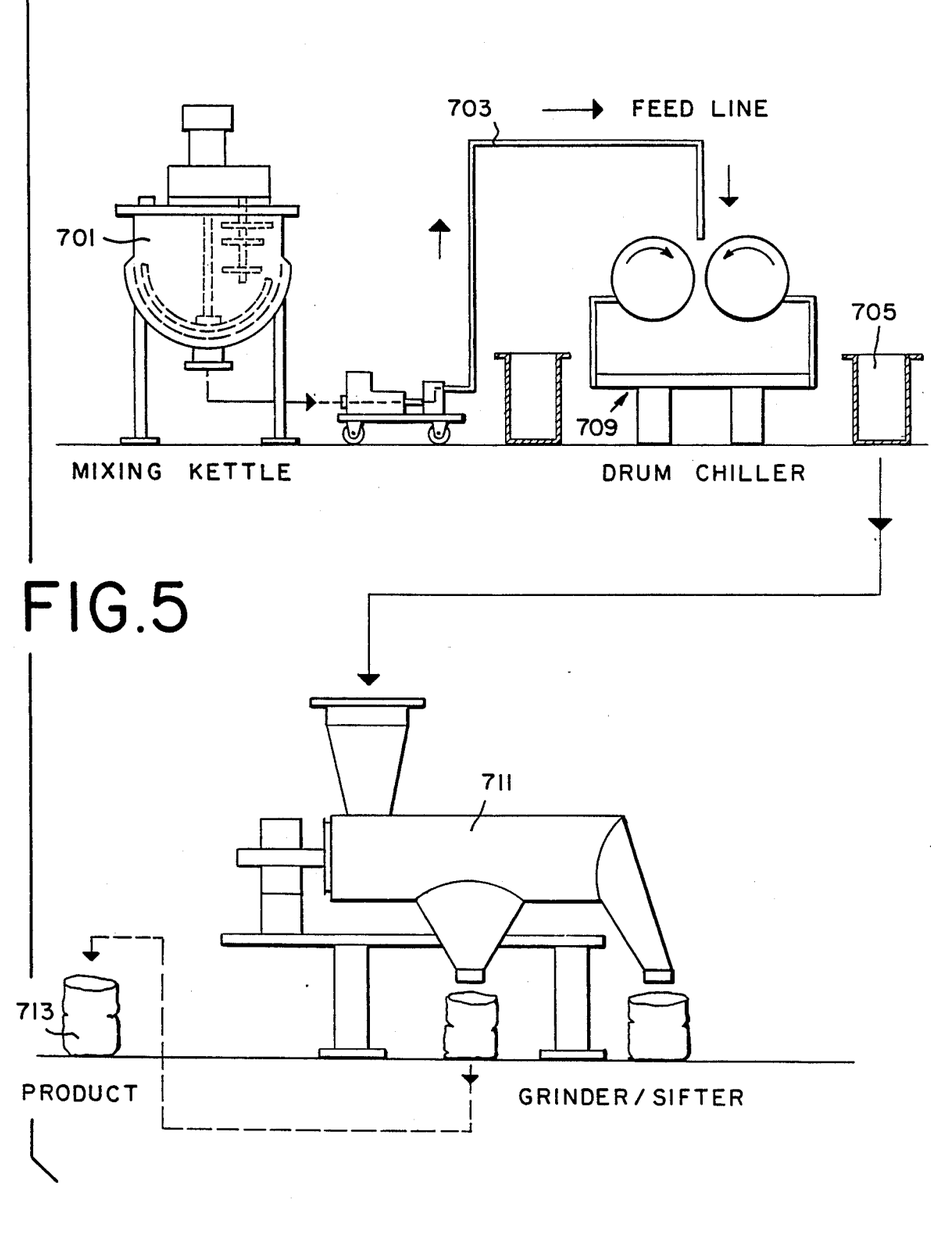
FIG. 5 is a flow diagram setting forth in schematic form the apparatus and process steps required in producing drum chilled flavor precursor powder useful in the practice of the process of our invention.

FIG. 5 is a schematic diagram setting forth a process and apparatus useful in preparing drum chilled flavor precursor powder useful in carrrying out the process of our invention wherein the resulting powder contains flavor precursor, e.g., phenyl alanine, leucine and a sugar such as cerelose.

The flavor precursor materials, that is the phenyl alanine, leucine and sugar is admixed with molten fat and emulsifier and texturizer in mixing kettle 701. The molten material is then pumped through feed line 703 into drum chiller 709. The resulting drum chilled product collected at location 705 is passed into grinder/sifter 711 and then collected at location 713.

An example of a grinder/sifter useable in the instant invention is the KEMUTEC BETAGRIND ®. Another example of workable apparatus is the KEK-Gardner Centrifugal Sifter.

The controlled release systems useful in the practice of our invention may also be prepared according to the process and using the apparatus set forth in U.S. Pat. No. 3,949,094 issued on Apr. 6, 1976, the specification for which is incorparated herein by reference.

Figure 6:
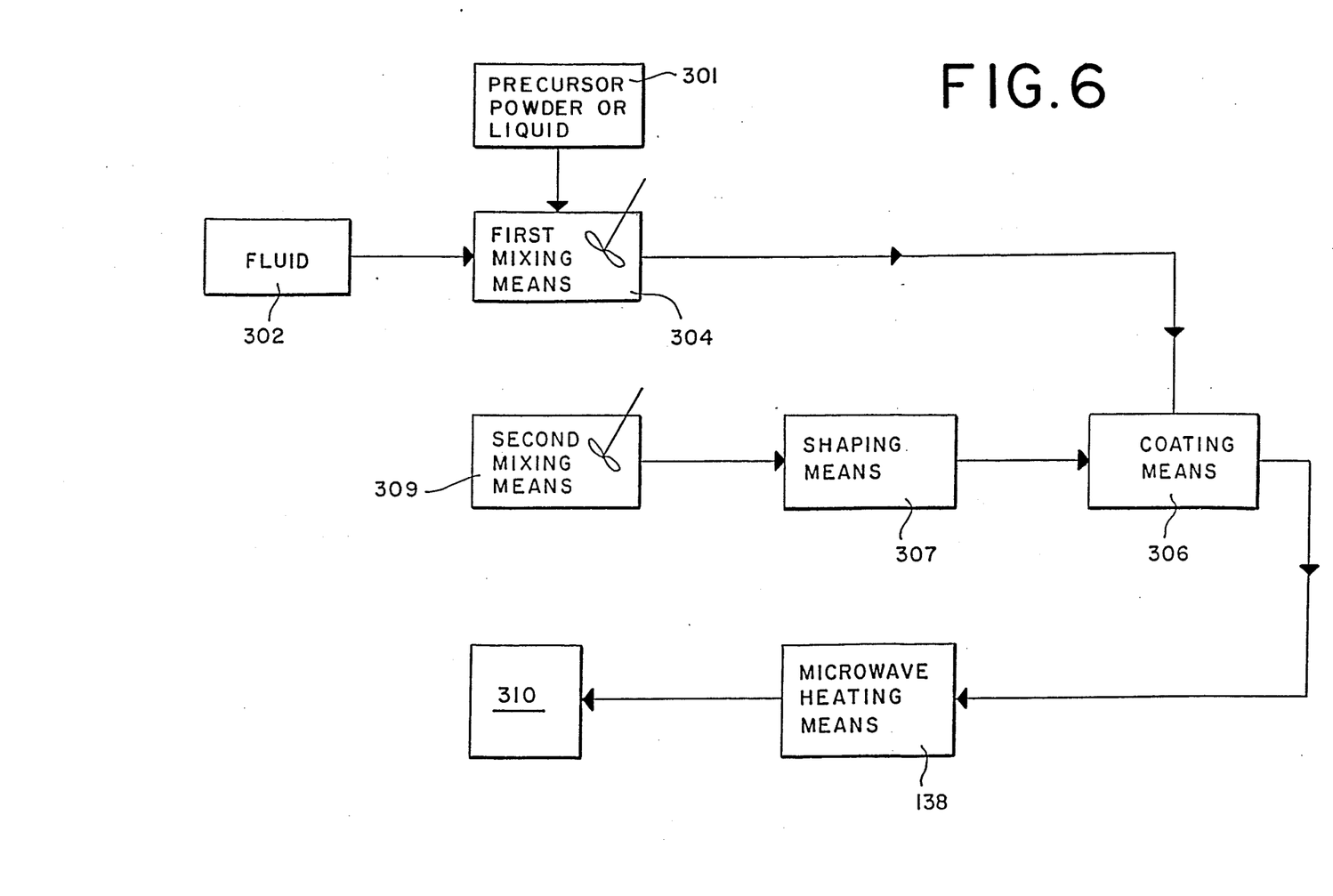
FIG. 6 is a block flow diagram showing the steps, in schematic form, for carrying out the process of our invention and indicating the multiple means (apparatus elements) useful in carrying out the process of our invention whereby an uncooked food article is coated with flavor (and optionally browning) precursor powder or liquid prior to microwave heating.

FIG. 6 sets forth a schematic block flow diagram of the process of our invention whereby fluid, e.g., glycerine heated at 302 and reactants, leucine, phenyl alanine and sugar at location 301 are mixed in mixing means 304. The resulting coating is utilized at coating means 306. Dough is mixed at mixing means 309 and shaped into pre-cooked uncoated food articles at shaping means 307. The shaped dough is then transported to coating means 306 where the fluid from 304 is coated onto the shaped pre-cooked food articles. The now coated shaped pre-cooked food articles are cooked in microwave means 138 using microwave source 42. The resulting cooked articles are then transported for marketing to location 310.

Figure 7:
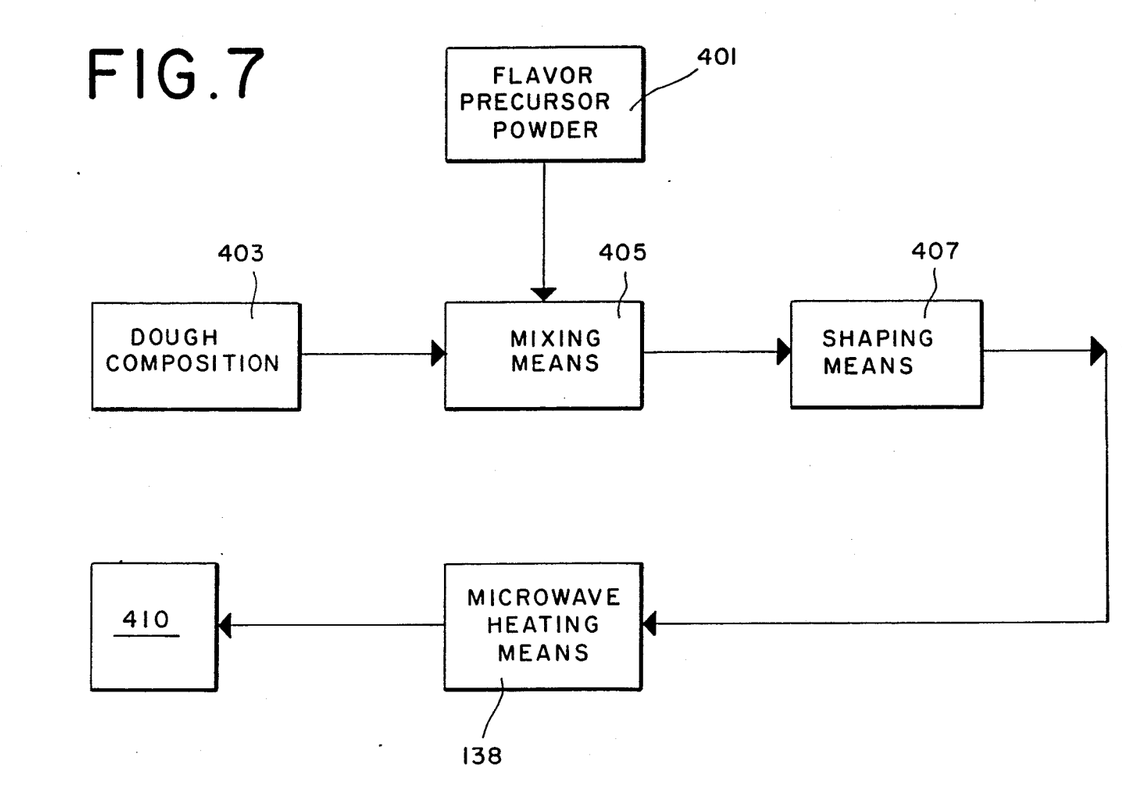
FIG. 7 is a block flow diagram showing the steps, in schematic form for carrying out another aspect of the process of our invention; and indicating the multiple means (apparatus elements) useful in carrying out that aspect of the process of our invention wherein flavor precursor powder is admixed into the matrix of an uncooked food article prior to microwave heating.

FIG. 7 sets forth a schematic block flow diagram of another aspect of the process of our invention whereby flavor precursor powder, for example, drum chilled flavor precursor power from location 519 in FIG. 3 or spray chilled flavor precursor powder from location 515 in FIG. 3 is transported from location 401 mixing means 405 where the flavor precursor powder is mixed with dough composition from location 403. The resulting product, dough composition containing flavor precursor powder is shaped at location 407 and then placed into microwave heating means 138. The now coated shaped uncooked food articles are cooked in microwave means 138 using microwave source 42 (shown in FIG. 2). The resulting cooked articles are then transported for marketing to location 410.

In summary, the solvents useful in carrying out our invention have dielectric constants which cause the cooking via microwave radiation to take place in under 120 seconds (in the range of from about 40 seconds up to about 120 seconds) whereby flavored microwaved cooked products are produced.

It should be noted an additional advantage achieved in practicing our invention wherein the flavor precursor liquid composition is coated onto uncooked baked goods foodstuffs is that water evaporation is retarded when the resulting coated product is cooked in a microwave oven. This advantage, too is unexpected, unobvious and advantageous.

The principles given above are illustrated in the following examples.

EXAMPLE I

Into 100 ml beakers were placed exactly 40.1 g of solvent. Each beaker was irradiation with 245 OMHz microwave radiation for 20 seconds, afterwhich the solvents temperature was measured. Experiments were run in triplicate. The results for several solvents are set forth in the following Table II.

TABLE II

| SOLVENT | TEMPERATURE (C.) |
| --- | --- |
| Propylene glycol | 91 |
| Glycerine | 88 |
| Ethanol | 78 |
| Water | 61 |
| Triacetin | 80 |

EXAMPLE II

Blotters weighing 0.61 g were dosed with 0.10 g of test solutions. The test solutions are each placed on the center of each of the blotters. Blotters spotted in this manner were irradiated with 2450 MHz microwave (750 watts) radiation for various periods of time, starting at 20 seconds. The results of testing variables are summarized in Table III.

The microwave radiation source is a 750 watt Amana RADARANGE ® Microwave Oven (trademark of the Amana Corporation).

TABLE III

| ENTRY | AMINO ACIDS | AMINO ACID WEIGHT | SUGAR | SUGAR WEIGHT | SOLVENT | SOLVENT WEIGHT | pH | pH ADJUSTMENT AGENT | pH ADJUSTMENT AGENT WEIGHT | MICROWAVE TIME | COLOR APPEARANCE | AROMA |
|---|---|---|---|---|---|---|---|---|---|---|---|---|
| II-1 | PHENYL ALANINE (MW 131.2) LEUCINE (MW 165.2) | 5.0 g 4.0 g | RIBOSE | 4.5 g | ETHANOL GLYCERINE | 16 g 25 g | 7-8 | NaHCO$_3$ (MW84) | 2.7 g | 20 sec. | TAN BURNT | MALTY COCOA |
| II-2 | PHENYL ALANINE LEUCINE | 5.0 g 4.0 g | RHAMNOSE | 5.5 g | ETHANOL GLYCERINE | 16 g 75 g | 7-8 | NaHCO$_3$ | 2.7 g | 20 sec. 40 sec. | YELLOW LIGHT BROWN | FAINT CHOCOLATE FAINT CHOCOLATE |
| II-3 | PHENYL ALANINE LEUCINE | 5.0 g 4.0 g | RHAMNOSE | 5.5 g | ETHANOL GLYCERINE | 16 g 25 g | 7-8 | NaHCO$_3$ | 5.4 g | 20 sec. 40 sec. | LIGHT BROWN BROWN | CHOCOLATE CHOCOLATE |
| II-4 | PHENYL ALANINE LEUCINE | 5.0 g 4.0 g | RHAMNOSE | 5.5 g | ETHANOL GLYCERINE | 16 g 75 g | 7-8 | NaHCO$_3$ | 4.5 g | 20 sec. 40 sec. | BROWN DARK BROWN | CHOCOLATE DARK COCOA |
| II-5 | PHENYL ALANINE LEUCINE | 5.0 g 4.0 g | CERELOSE | 5.5 g | ETHANOL GLYCERINE | 16 g 25 g | 7-8 | NaHCO$_3$ | 5.4 g | 20 sec. 40 sec. 60 sec. | LIGHT YELLOW LIGHT BROWN NO CHANGE | NONE FAINT CHOCOLATE NONE |
| II-6 | PHENYL ALANINE LEUCINE | 5.0 g 4.0 g | CERELOSE | 5.5 g | ETHANOL GLYCERINE | 16 g 75 g | 7-8 | NaHCO$_3$ | 5.4 g | 20 sec. 40 sec. 60 sec. | BROWN YELLOW BROWN DARK BROWN | NONE CHOCOLATE DARK CHOCOLATE |
| II-7 | PHENYL ALANINE LEUCINE | 5.0 g 4.0 g | CERELOSE | 11.0 g | ETHANOL GLYCERINE | 16 g 75 g | 7-8 | NaHCO$_3$ | 5.4 g | 20 sec. 40 sec. 60 sec. | NONE TAN LIGHT BROWN | NONE FAINT CHOCOLATE MILK CHOCOLATE |

EXAMPLE III

Formation of Drum Chilled Chocolate Flavor Precursor Power

The following mixture is prepared:

| Ingredients | Parts by Weight |
| --- | --- |
| Sugar-amino acid composition of Example II-6 (10.0 grams phenyl alanine, 8.0 grams leucine and 11 grams cerelose) | 30 grams |
| 20% MYVEROL ® 1806 in DURKEE ® 17 (MYVEROL ® is a fatty acid mono glyceride and DURKEE ® 17 is a stearic acid ester manufactured by the Glidden-Durkee Corporation of St. Louis, Missouri) | 24 grams |
| SIPERNAT ® 50S (a precipitated silicon dioxide composition having a bulk density of 6.2 pounds per cubic foot; and average particle size of 8 microns; and a surface area of 450 square meters per gram manufactured by the Degussa Corporation of Teterboro, New Jersey) | 6 grams |

The flavor precursor composition is intimately admixed with the SIPERNATE ®50S a Hobart mixer (No. 1 speed for 5 minutes). The mix becomes a mass of paste and the resulting mass is intimately admixed with the fat mixture (30% MYVEROL ®1806 and 70% STEARINE ®17).

The resulting product is drum chilled at a speed of 5 in a small unit drum-drier producing 0.5 pounds per minite. The temperature of the feed is 170° F. The drum-drier is:

Blaw-Knox Model 639.

The drum chilled films were crushed and sifted through a Baker's screen basket and then sieved through a No. 10 sieve.

EXAMPLE IV

Production of Chocolate Cake

The following materials are utilized in various combinations as set forth in Examples IV(A), IV(B) and IV(C), infra.

| Ingredients | Parts by Weight |
| --- | --- |
| Egg | 100 g |
| Water | 300 g |
| Corn Oil | 100 g |
| Flavor Precursor (of Example II) | 255 g |
| Sodium chloride | 2 g |
| Baking powder | 3 g |
| CRISCO ® (a trademark of the Proctor & Gamble Company of Cincinnati, Ohio) | 40 g |
| Sugar | 200 g |
| Baker's chocolate | 4.5 g |
| Product of Example III | 0.5 g |

EXAMPLE IV(A)

The egg, water, corn oil, flavor precursor mixture, salt, baking soda, CRISCO ® shortening, sugar and melted baker's chocolate are intimately admixed.

EXAMPLE IV(B)

The egg, water, corn oil, flavor precursor composition of Example II-6, salt, baking soda, CRISCO ® shortening, sugar, melted baker's chocolate and the product of Example III are initmately admixed.

EXAMPLE IV(C)

The melted baker's chocolate and product of Example III are intimately admixed. The mixture is added to corn oil, CRISCO ® and shortening. Then egg, water, sodium chloride, baking soda and flour is added and the resulting product is intimately admixed.

Doughs's from Examples IV(A), IV(B) and IV(C) were baked separately in a 1050 watt microwave oven for 12 minutes turning 90 degrees after six minutes.

In a blind panel test:
(i) cakes (A) and (B) were judged to be equal to each other by taste and room aroma; and
(ii) cake (C) was unanimously judged to be superior in taste and room aroma with reference to cakes (A) and (B).

On organoleptic scale of 1-10 (with 1 being the least preferred and 10 being the most preferred) cake (A) was given a value of 7; cake (B) was given a value of 7 and cake (C) was given a value of 9.

What is claimed is:

1. A process for providing a cooked baked goods foodstuff having an intense chocolate flavor comprising the steps of:
   (a) providing an uncooked baked goods composition;
   (b) providing a mixture of precursors of a chocolate flavor reaction product having a pH of from about 9 up to about 13 consisting essentially of phenyl alanine, leucine, a sugar selected from the group selected from the group consisting of rhamnose, ribose and cerelose and a solvent which is capable of raising the dielectric constant of the foodstuff to be cooked selected from the group consisting of glycerine, propylene glycol, mixtures of glycerine and propylene glycol, mixtures of glycerine and ethanol, and mixtures of propylene glycol and ethanol;
   (c) either coating the mixture of (b) onto the uncooked baked composition provided in (a) or intimately admixing the mixture of (b) with the uncooked baked goods composition provided in (a); and
   (d) exposing the thus treated uncooked foodstuff to microwave radiation for a period of time sufficient to cause a chocolate flavor profile to be imparted to the foodstuff.

2. The product produced according to the process of claim 1.

3. A process for providing a cooked baked goods foodstuff having an intense chocolate flavor comprising the steps of:
   (a) providing an uncooked baked goods composition having a continuous surface;
   (b) providing a mixture of precursors of a chocolate flavor reaction product having a pH of from about 9 up to about 13 consisting essentially of phenyl alanine, leucine, a sugar selected from the group consisting of rhamnose, ribose and cerelose and a solvent which is capable of raising the dielectric constant of the foodstuff to be cooked selected from the group consisting of glycerine, propylene glycol, mixtures of glycerine and propylene glycol, mixtures of glycerine and ethanol and mixtures of propylene glycol and ethanol, whereby the foodstuff to be cooked is completely cooked in a period of time between 40 seconds and 120 seconds;

(c) coating the mixture of (b) onto the said continuous surface of the said uncooked baked goods composition provided in (a); and (d) exposing the thus coated uncooked foodstuff to microwave radiation for a period of time between 40 seconds and 120 seconds, sufficient to cause a chocolate flavor profile to be imparted to the foodstuff.

4. The product produced according to the process of claim 3.

5. A process for providing a cooked baked goods foodstuff having an intense chocolate flavor comprising the steps of:

(a) providing an uncooked baked goods composition;

(b) providing a fat-enrobed mixtured of precursors of a chocolate flavor reaction product consisting of phenyl alanine, leucine and a sugar selected from the group consisting of rhamnose, ribose and cerelose;

(c) intimately admixing the said precursor mixture into the composition of (a) thereby forming an uncooked baked goods/chocolate flavor precursor mixture;

(d) exposing the thus treated uncooked foodstuff to microwave radiation for a period of time sufficient to cause a chocolate flavor profile to be imparted to the foodstuff.

6. The product produced according to the process of claim 5.

7. A process for providing a cooked baked goods foodstuff having an intense chocolate flavor comprising the steps of:

(a) providing an uncooked baked goods composition;

(b) providing a first mixture of precursors of a chocolate flavor reaction product having a pH of from about 9 up to about 13 consisting essentially of phenyl alanine, leucine, a sugar selected from the group consisting of rhamnose, ribose and cerelose and a solvent which is capable of raising the dielectric constant of the foodstuff to be cooked selected from the group consisting of glycerine, propylene glycol, mixtures of glycerine and propylene glycol, mixtures of glycerine and ethanol and mixtures of propylene glycol and ethanol;

(c) providing a fat-enrobed second mixture of precursors of a chocolate flavor reaction product consisting of phenyl alanine, leucine and a sugar selected from the group consisting of rhamnose, ribose and cerelose;

(d) intimately admixing said second precursor mixture into the composition of (a) thereby forming an uncooked baked goods/chocolate flavor precursor mixture;

(e) coating the mixture of (b) onto the surface of the thus created uncooked foodstuff; and (f) exposing the thus coated uncooked foodstuff to microwave radiation for a period of time sufficient to cause a chocolate profile to be imparted to the foodstuff.

8. The product produced according to the process of claim 7.

* * * * *